(12) United States Patent
Joo (10) Patent No.: US 10,971,732 B2
(45) Date of Patent: Apr. 6, 2021

(54) LITHIUM NEGATIVE ELECTRODE HAVING METAL FOAM AND LITHIUM SECONDARY BATTERY USING THE SAME

(71) Applicant: Seung-ki Joo, Seongnam (KR)

(72) Inventor: Seung-ki Joo, Seongnam (KR)

(*) Notice: Subject to any disclaimer, the term of this patent is extended or adjusted under 35 U.S.C. 154(b) by 240 days.

(21) Appl. No.: 16/238,957

(22) Filed: Jan. 3, 2019

(65) Prior Publication Data

US 2019/0288295 A1 Sep. 19, 2019

(30) Foreign Application Priority Data

Mar. 14, 2018 (KR) .................. 10-2018-0029518

(51) Int. Cl.
| | |
|---|---|
| *H01M 4/80* | (2006.01) |
| *H01M 10/052* | (2010.01) |
| *H01M 4/38* | (2006.01) |
| *H01M 4/66* | (2006.01) |
| *H01M 4/02* | (2006.01) |

(52) U.S. Cl.
CPC ........... *H01M 4/808* (2013.01); *H01M 4/382* (2013.01); *H01M 4/661* (2013.01); *H01M 4/667* (2013.01); *H01M 10/052* (2013.01); *H01M 2004/021* (2013.01); *H01M 2004/027* (2013.01)

(58) Field of Classification Search
CPC ...... H01M 1/808; H01M 4/382; H01M 4/661; H01M 4/667; H01M 10/052
See application file for complete search history.

(56) References Cited

U.S. PATENT DOCUMENTS

| | | | | |
|---|---|---|---|---|
| 2005/0106467 | A1* | 5/2005 | Hambitzer | ............ H01M 4/13 |
| | | | | 429/235 |
| 2007/0248887 | A1* | 10/2007 | Eskra | .................... H01M 4/808 |
| | | | | 429/235 |
| 2013/0040188 | A1* | 2/2013 | Zinck | ............... H01M 10/0525 |
| | | | | 429/163 |

FOREIGN PATENT DOCUMENTS

KR            101352262            1/2014

* cited by examiner

*Primary Examiner* — Helen Oi K Conley
(74) *Attorney, Agent, or Firm* — Cantor Colburn LLP (57) ABSTRACT

Provided is a lithium negative electrode having metal foam capable of significantly improving the safety and reliability of a lithium secondary battery by suppressing volume expansion and consumption of a lithium material due to charge/discharge repetition of the lithium secondary battery, and a lithium secondary battery using the lithium negative electrode. The negative electrode for a lithium secondary battery includes: a negative electrode current collector made of metal foam having a plurality of pores whose inner portions are empty; and a lithium thin film attached to a rear surface of the electrode current collector.

4 Claims, 5 Drawing Sheets

LITHIUM NEGATIVE ELECTRODE HAVING METAL FOAM AND LITHIUM SECONDARY BATTERY USING THE SAME

BACKGROUND

1. Field

The present disclosure relates to a lithium negative electrode having a metal foam and a lithium secondary battery using the lithium negative electrode. More particularly, the present disclosure relates to a lithium negative electrode having a metal foam capable of greatly improving safety and reliability of a lithium secondary battery by suppressing volume expansion and consumption of a lithium material due to charge/discharge repetition of the lithium secondary battery, and a lithium secondary battery using the lithium negative electrode.

2. Description of the Related Art

Recently, there was a need for a battery such as a secondary battery with a light weight, a small size, and a high capacity in a portable device, a toy model helicopter, a drone (a manless and unmanned aircraft capable of flying and steerable by induction of radio waves), etc. Accordingly, among secondary batteries, lithium secondary batteries having high energy density, operating potential and stable lifetime are commercially available and widely used.

Until now, the negative electrode of a lithium secondary battery has been made to have a very thin thickness by coating a small amount of a negative electrode active material containing graphite on a thin copper (Cu) foil having a two-dimensional structure in a slurry state and then performing a heat treatment and a pressing process.

In such a negative electrode, lithium ions are separated from a positive electrode at the time of charging and reach the graphite through an electrolyte. However, when the contact between lithium and graphite is poor, lithium atoms are separated from the graphite surface and contained in the electrolytic solution. Thus, the lithium atoms that fall off into the electrolyte cannot participate in an electrochemical reaction.

Therefore, as the charging/discharging is repeated, the amount of lithium falling off into the electrolyte increases, which eventually causes problems in the packaging, causing air to flow into the battery, resulting in explosion. In addition, since the lithium element is depleted due to repetitive use, even with no explosion, the capacity reduction cannot be avoided.

When a lithium secondary battery is manufactured by the above-described structure, lithium (Li) should be electrolyzed at the positive electrode and electrodeposited to the negative electrode, during charging/discharging. In this case, when the adhesive force to the negative electrode is weak, the lithium is separated from the surface of the negative electrode and falls off into the electrolyte while forming a lump on the surface of the negative electrode. As a result, the volume of the battery expands as a whole. Thus, lithium agglomerates separated from the surface of the negative electrode can no longer be used for charging/discharging, but merely cause a bulky expansion of the battery.

In addition, a film-type separator used for separating the negative electrode and the positive electrode has a problem that when the battery is overcharged, a space is generated between the negative electrode and the film-type separator. Lithium ions that could not enter the inside of the negative electrode are accumulated on the surface of the negative electrode, that is, in a space formed between the negative electrode and the film-type separator. Accordingly, lithium dendrite, which is extracted onto the lithium metal, is formed. Such a lithium dendrite may have a problem that the positive electrode and the negative electrode are in contact with each other through the film-like separator, and at the same time side reactions occur between the lithium metal and the electrolyte, and the battery is ignited and exploded due to heat generation and gas generation resulting from the side reactions.

Meanwhile, Korean Patent Registration No. 10-1353262 (Patent Document 1) discloses a metal foam for a lithium secondary battery electrode in which a part or the whole of a surface and an inner pore wall are coated with an active material, in which the active material is coated so as to be in direct contact with the surface of the metal foam and the inner pore wall without involvement of a binder or a conductive material.

Patent Document 1 proposes a metal foam for a lithium secondary battery electrode in which, for example, copper (Cu) foam is coated with tin oxide ($SnO_2$) as an active material, and discloses a structure in which tin oxide ($SnO_2$) used as an active material is formed on a copper (Cu) foam used as a current collector without using a binder or a conductive material.

In addition, Patent Document 1 discloses a coin cell in which a copper foil is used as a working electrode, a lithium foil is used as a counter electrode, a polypropylene (PP) film is used as a separator, and 1M of a $LiPF_6$ solution which is formed as an electrolyte by melting $LiPF_6$ into a solvent formed by mixing ethylene carbonate (EC) with diethyl carbonate (DEC) (in a 1:1 volume ratio).

However, since the battery disclosed in Patent Document 1 uses the lithium foil as the negative electrode, the volume of the battery is expanded as a whole as the lithium agglomerate falls off into the electrolyte on the surface of the negative electrode, and the capacity reduction of the battery cannot be avoided.

SUMMARY

The present disclosure has been made in view of such conventional problems, and it is an object of the present disclosure to provide a lithium negative electrode having a metal foam in which a lithium agglomerate generated on the surface of the lithium negative electrode is contained in the metal foam having pores whose inner portions are empty even during repeated charging and discharging, thereby preventing the lithium agglomerate from flowing into an electrolyte to thus suppress a volume expansion of a lithium secondary battery, which prevents the risk of explosion and secures stability, and a lithium secondary battery using the lithium negative electrode.

It is another object of the present disclosure to provide a lithium negative electrode having a metal foam capable of significantly improving the safety and reliability of a lithium secondary battery by suppressing consumption of a lithium material due to charging/discharging and preventing a performance degradation phenomenon and a lithium secondary battery using the lithium negative electrode.

It is another object of the present disclosure to provide a lithium negative electrode having a metal foam in which metal foams are applied to the negative electrode to inhibit the formation of lithium agglomerates on the surface of the negative electrode and to prevent separation of the lithium agglomerates from the surface of the negative electrode to an electrolyte, and to solve side effects that occur when lithium is grown in a dendrite structure on the surface of the negative electrode when being overcharged, and a lithium secondary battery using the lithium negative electrode.

According to an aspect of the present disclosure, there is provided a negative electrode for a lithium secondary battery, the negative electrode comprising: a negative electrode current collector made of a metal foam having a plurality of pores whose inner portions are empty; and a lithium thin film attached to a rear surface of the negative electrode current collector.

The negative electrode for a lithium secondary battery according to an embodiment further includes a negative electrode material partially filled in the pores of the metal foam, and the negative electrode material can be filled in less than half of the metal foam.

The metal foam may include a first region disposed in contact with the lithium thin film and filled with the negative electrode material in the pore, and a second region disposed in front of the first region in contact with a separator in which inner portions of the pores are empty.

Furthermore, the metal foam may be formed of Ni, Cu, or the metal foam may have a surface coated or alloyed with Cu, and the pore size of the metal foam may be set in the range of about 100 μm to about 3,000 μm.

In this case, the second region in which the inner portions of the pores are empty may be used as a space in which the lithium agglomerates decomposed from the negative electrode may be electrodeposited during charging and discharging of the battery.

According to another aspect of the present disclosure, there is provided a negative electrode for a lithium secondary battery, the negative electrode comprising: a negative electrode current collector made of a metal foam having a plurality of pores; a lithium thin film attached to a rear surface of the negative electrode current collector; and a negative electrode material partially filled in the pores of the metal foam in contact with the lithium thin film, wherein the negative electrode material is filled with less than half of the metal foam.

According to another aspect of the present disclosure, there is provided a lithium secondary battery comprising: a positive electrode; a negative electrode; and a separator disposed between the positive electrode and the negative electrode.

In this case, the positive electrode includes a positive electrode current collector made of a metal foam having a plurality of pores; and a positive electrode material filled in the pores of the metal foam of the positive electrode current collector.

The material of the metal foam of the positive electrode current collector may be Al, or one of nickel alloys including Ni—Cr—Al, Ni—Cr and Ni—Al.

The positive electrode is formed with a plurality of pores through which the electrolyte can permeate into the positive electrode material and can be obtained by filling a positive electrode slurry in the metal foam of the positive electrode current collector, performing an initial heat treatment and pressing only until the positive electrode slurry is formed to be a gel state, and then performing final heat treatment.

DETAILED DESCRIPTION

Hereinafter, embodiments of the present invention will be described in detail with reference to the accompanying drawings. The sizes and shapes of the components shown in the drawings may be exaggerated for clarity and convenience.

Figure 1:
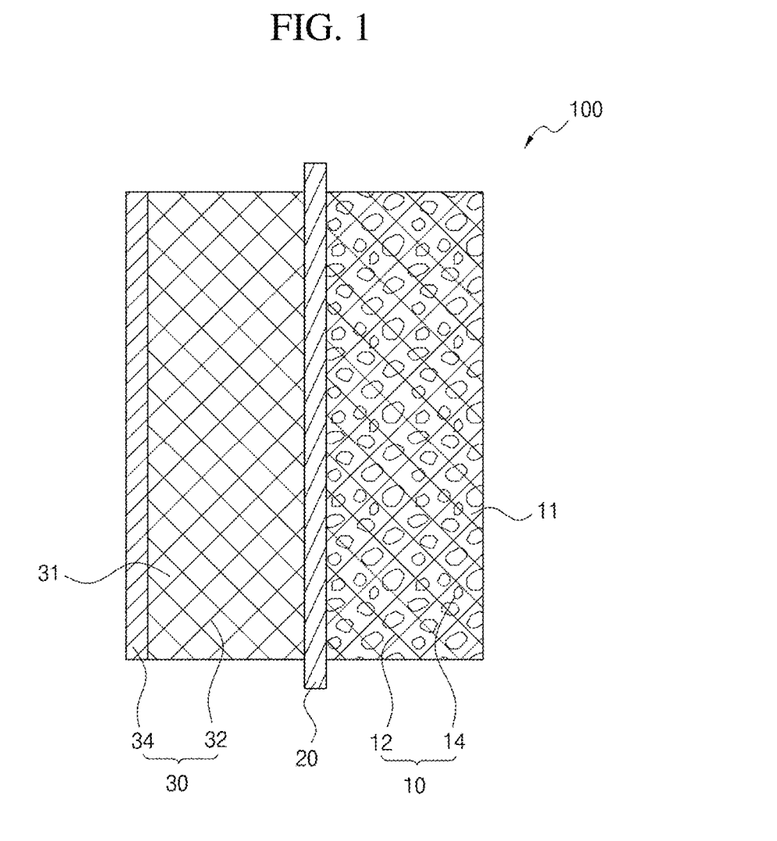
FIG. 1 is a schematic diagram of a lithium secondary battery using a lithium negative electrode in which a lithium thin film is laminated on a metallic foam whose inner portions of pores are empty according to a first embodiment.

FIG. 1 is a schematic diagram of a lithium secondary battery using a lithium negative electrode in which a lithium thin film is laminated on a metallic foam whose inner portions of pores are empty according to a first embodiment. FIG. 1 illustrates a structure in which a lithium secondary battery according to an embodiment is composed of a full cell. The present invention may be a bicell structure instead of a full cell, or a mixed structure of the bicell and the full cell.

The lithium secondary battery 100 according to the first embodiment is encapsulated in a can or a pouch together with an electrolyte to constitute a secondary battery, and includes a positive electrode 10, a negative electrode 30, and a separator 20.

The positive electrode 10 includes a positive electrode current collector 12 made of a metal foam and a positive electrode material 14 filled in the metal foam of the positive electrode current collector 12.

The negative electrode 30 has a structure in which a negative electrode current collector 32 made of a metal foam and a foil-type lithium thin film 34 laminated on a rear surface of the negative electrode current collector 32. In this case, the negative electrode 30 may be integrally formed on the rear surface of the metal foam by vapor deposition instead of attaching the lithium thin film 34 to the negative electrode current collector 32 of the metal foam.

The separator 20 is disposed between the positive electrode 10 and the negative electrode 30 and may be a single layer porous separator or a multi-layered polyolefin-based porous separator having a shutdown function.

In addition, the separator 20 may be a high heat-resistant separator with reduced heat shrinkage by coating a ceramic slurry made of a ceramic material and a binder on one side or both sides of a polyolefin-based porous separator to improve the heat resistance of the separator 20 to form a ceramic coating layer.

Furthermore, the separator 20 used in this embodiment is composed of an ultrafine fiber-phase of a mixture of a heat-resistant polymer and inorganic particles, or a mixture of a heat-resistant polymer, a swelling polymer, and inorganic particles, or the separator 20 may be a separator containing a porous polymer fibrous web serving as an ion-impregnated layer.

In addition, the separator used in this embodiment may be a separator containing a pair of porous polymer fibrous webs which are laminated on one side or both sides of a porous nonwoven fabric having micropores and which serve as an adhesive layer and an ion-impregnated layer when closely contacting an opposed electrode.

The positive electrode current collector 12 and the negative electrode current collector 32 are made of metal foams having open pores 11 and 31 of a three-dimensional structure formed therein. One of Al, NiCrAl, NiCr and NiAl can be used for the positive electrode current collector 12 and one of Ni, Cu or a material obtained by coating or alloying Cu with a Ni frame can be used for the negative electrode current collector 32.

In some embodiments, the metal foams used for the positive and negative electrode current collectors 12 and 32 may have pores 11 and 31 having a size ranging from about 100 μm to 3000 μm, respectively. Preferably, a pore size ranges from about 450 μm to about 1200 μm.

If the pore size of the metal foam is less than about 100 μm, it is very difficult to produce the metal foam. When the pore size of the metal foam is more than about 3000 μm, the bonding strength between the metal foam and the lithium electrodeposited on the metal foam is decreased, and the lithium agglomerates electrodeposited on the surface of the negative electrode may be separated, so that the pore size of the metal foam is preferably in the range of about 100 μm to about 3000 μm.

The thickness of the metal foam is in the range of about 240 μm to about 1500 μm, more preferably in the range of about 500 μm to about 1000 μm.

In the positive electrode 10, a metal foam of the positive electrode current collector 12 is filled with a positive electrode material 14. The positive electrode material 14 is formed by filling a metal foam with a slurry prepared by mixing a positive electrode active material, a binder, and an organic solvent, and then removing the organic solvent by heat treatment.

The positive electrode material 14 includes a positive electrode active material capable of reversibly intercalating and deintercalating lithium ions. Typical examples of such a positive electrode active material include one or a mixture of two or more of a layered compound such as lithium cobalt oxide ($LiCoO_2$) and lithium nickel oxide ($LiNiO_2$), or a compound substituted with one or more transition metals; lithium manganese oxide (LMO) such as a chemical formula $Li_{1+y}Mn_{2-y}O_4$ (where y is about 0 to about 0.33), $LiMnO_3$, $LiMn_2O_3$, and $LiMnO_2$; lithium copper oxide such as $Li_2CuO_2$; vanadium oxide such as $LiV_3O_8$, $LiFe_3O_4$, $V_2O_5$, and $Cu_2V_2O_7$; Ni-site type lithium nickel oxide represented by a chemical formula $LiNi_{1-y}M_yO_2$ (where M=Co, Mn, Al, Cu, Fe, Mg, B or Ga and y=about 0.01 to about 0.3); lithium manganese complex oxide represented by a chemical formula $LiMn_{2-y}M_yO_2$ (where M=Co, Ni, Fe, Cr, Zn or Ta and y=about 0.01 to about 0.1) or $Li_2Mn_3MO_8$ (where M=Fe, Co, Ni, Cu or Zn); $LiMn_2O_4$ in which a part of Li in the chemical formula is substituted with an alkaline earth metal ion; disulfide compound; carbon such as $Fe_2(MoO_4)_3$, non-graphitized carbon, and graphite carbon; metal complex oxide such as $Li_xFe_2O_3$ ($0 \le x \le 1$), $Li_xWO_2$ ($0 \le x \le 1$), $SnxMe_{1-x}Me'_yO_z$ (Me: Mn, Fe, Pb, Ge; Me': Al, B, P, Si, elements of Groups 1, 2 and 3 of the periodic table, halogen; $0 < x \le 1$; $1 \le y \le 3$; $1 \le z \le 8$); lithium metal; lithium alloy; silicon-based alloy; tin-based alloy; Metal oxide such as $SnO_2$, $PbO_2$, $Pb_2O_3$, $Pb_3O_4$, $Sb_2O_3$, $Sb_2O_4$, $Sb_2O_5$, $GeO_2$, $Bi_2O_3$, $Bi_2O_4$ and $Bi_2O_5$; lithium nickel cobalt manganese (NCM)-based active material; a material capable of absorbing and desorbing lithium such as Li—Co—Ni-based materials, but are not limited thereto.

Meanwhile, the lithium secondary battery 100 according to the first embodiment includes the negative electrode 30 in which the lithium thin film 34, which is made of lithium metal, is used as a negative electrode material capable of reversibly intercalating and deintercalating lithium ions, and the negative electrode current collector 32 of a metal foam having a plurality of pores 31 whose inner portions are empty in which an additional negative electrode material is not filled is formed and disposed on the front surface of the lithium thin film 34.

The thickness of the lithium thin film 34 is suitably about 500 μm. If the thickness of the lithium thin film 34 is more than about 500 μm, there is a problem that the thickness of the battery becomes thick due to unnecessary thickness without affecting the performance of the battery.

When the negative electrode current collector 32 made of such a metal foam is disposed on the front surface of the lithium thin film 34, lithium ions separated from the positive electrode 10 at the time of charging are in contact with the lithium thin film 34 and the metal foam of the negative electrode current collector 32 through the electrolyte into the metal foams having a plurality of pores 31 and are electrodeposited on the surfaces of the lithium thin film 34 and the negative electrode current collector 32 of the metal foam.

In this case, the metal foam increases the adhesion of lithium atoms to the surface of the negative electrode, that is, the lithium thin film 34, and even if lithium agglomerates are formed by electrodeposition of the lithium atoms onto the surface of the lithium thin film 34, the lithium atoms are captured in the pores 31 of the metal foam, to thus prevent the lithium agglomerates from flowing into the electrolyte.

In general, a separator 20 is inserted between the positive electrode 10 and the negative electrode 30 to prevent a short circuit between the positive electrode 10 and the negative electrode 30. However, lithium dendrite may grow on the surface of the negative electrode when overcharged. In this case, in some embodiments, the negative electrode current collector 32 made of metal foam is formed on the surface of the negative electrode of the lithium thin film 34, and a metal foam space 32 having an empty inner space is formed between the negative electrode 30 and the film-type separator 20. Accordingly, even if lithium ions deposit on the surface of the negative electrode and are precipitated as lithium metal, they are trapped in the negative electrode current collector 32 of the metal foam, thereby suppressing the deterioration of the stability of the battery due to formation of the lithium dendrite.

The lithium secondary battery 100 according to the first embodiment can be manufactured without filling the negative electrode current collector 32 made of a hollow metal foam with a negative electrode material as the negative electrode 30, but by attaching a lithium thin film 34 which is a lithium metal serving as a negative electrode material on a rear surface of the negative electrode current collector 32.

Figure 2:
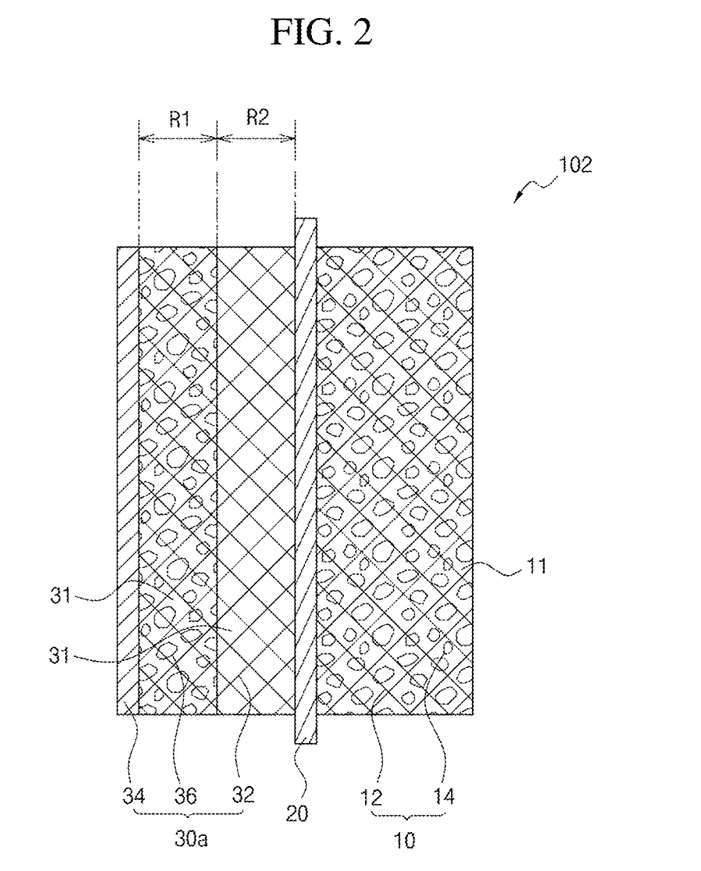
FIG. 2 is a schematic diagram of a lithium secondary battery using a lithium negative electrode in which a negative electrode active material slurry is filled in a part of a metal foam whose inner portions of pores are empty according to a second embodiment.

The present invention is not limited to this, but it is also possible to configure a negative electrode 30a deformed like a lithium secondary battery 102 according to a second embodiment shown in FIG. 2.

That is, in the lithium secondary battery 102 according to the second embodiment, the positive electrode 10 and the separator 20 are the same as those of the first embodiment, but the second embodiment differs from the first embodiment in terms of using only a deformed negative electrode 30a.

Therefore, in describing the second embodiment, description of the same portions as those of the first embodiment will be omitted, and only the modified negative electrode 30a which is a difference will be described.

The negative electrode 30a according to the second embodiment is the same as in the first embodiment, in terms of having a lithium thin film 34 which is a lithium metal serving as a negative electrode material on a rear surface of the negative electrode current collector 32 made of a metal foam having open pores 31 of a three-dimensional structure therein.

In the second embodiment, the metal foam of the negative electrode current collector 32 is divided into a first region R1 and a second region R2. The negative electrode material 36 is filled in the first region R1 that is in contact with the lithium thin film 34 and the negative electrode material is not filled in the second region R2 that is in contact with the separator 20, but the second region R2 may have a structure in which an empty pore shape is maintained as it is.

The first region R1 in which the negative electrode material is filled in the negative electrode current collector 32 is preferably less than ½ of the entire area of the negative electrode current collector 32 in consideration of a sufficient accommodation space of the second region R2 in which the lithium agglomerate is received.

The negative electrode material filled in the first region R1 of the negative electrode current collector 32 may include one of carbon-based, silicon-based, metal-based, and oxide-based negative electrode materials.

Specific negative electrode materials may be selected from the group consisting of carbon-based negative electrode active materials of crystalline or amorphous carbon, carbon fibers, or carbon composites, tin oxide, lithiated carbon-based negative electrode active materials, lithiated tin oxide, lithium alloys, and mixtures of two or more thereof. Here, the carbon may be at least one selected from the group consisting of carbon nanotubes, carbon nanowires, carbon nanofibers, graphite, activated carbon, graphene and graphite.

In addition, the negative electrode material includes another negative electrode active material capable of reversibly intercalating and deintercalating lithium ions, and any of the commonly used negative electrode active materials may be used as the negative electrode material.

The cathode 30a according to the second embodiment is formed by filling a slurry made by mixing the negative electrode active material with a binder, a conductive material and an organic solvent only in the first region R1 of the negative electrode current collector 32, and maintaining the second region R2 in a porous shape as it is.

When the thickness of the metal foam forming the negative electrode current collector 32 is set to about 500 μm, the thickness of the lithium foil used as the lithium thin film 34 is preferably set to about 500 μm or less in the negative electrode 30a according to the second embodiment.

When the negative electrode current collector 32 is set to a thickness of, for example, about 1000 μm, the first region R1 in which the negative electrode material is filled is preferable about ½ or less of the entire region of the negative electrode current collector 32, that is, about 500 μm or less, in consideration of a sufficient accommodation space in the second region R2 in which the lithium agglomerate is accommodated.

As a result, in the lithium secondary battery 102 according to the second embodiment employing the negative electrode 30a, even if charging and discharging of the battery are repeated, the second region R2 of the negative electrode current collector 32, which is in contact with the electrolyte, as in the first embodiment, may cause enlargement of the surface area by maintaining the pores 31 of the metal foam, to increase the adhesion of the lithium atoms to the surface of the negative electrode and to trap the lithium atoms in the pores 31 of the metal foam even if the lithium agglomerate is formed to thereby prevent the lithium atoms from flowing into the electrolyte. As a result, a volume expansion due to a repeated use of a lithium secondary battery can be suppressed, depletion of the lithium element can be prevented, and safety and reliability of the battery can be ensured.

Hereinafter, a method of producing the lithium secondary battery according to an embodiment will be described.

First, as shown in FIGS. 1 and 2, the negative electrodes 30 and 30a together with the positive electrode 10 are also formed by using the metal foams having pores 11 and 31 as positive and negative current collectors 12 and 32, respectively.

In the case of the positive electrode 10, a positive electrode slurry made by mixing an active material, a binder, a conductive material and an organic solvent, is filled into a plurality of pores 11 of a metal foam forming the positive electrode current collector 12.

It is preferable that the positive electrode slurry is filled into the plurality of pores 11 of a metal foam and then subjected to a primary rough heat treatment only until the gel state is obtained. Then, the positive electrode slurry is pressed to an appropriate thickness and then subjected to a final heat treatment so as to sufficiently form micropores capable of causing the electrolyte to permeate into the positive electrode.

Meanwhile, in the case of the negative electrode 30, the structure of the first embodiment of FIG. 1 is formed in a manner that the lithium thin film 34 is adhered or deposited on a rear surface of the negative electrode current collector 32 of the metal foam. In the structure of the second embodiment of FIG. 2, when one negative electrode slurry among, for example, the carbon-based, silicon-based, metal-based, or oxide-based negative electrode slurry, is used as the negative electrode material, only the first region R1 is filled with the negative electrode slurry, and thus only half of the entire negative electrode metal foam is filled with the negative electrode slurry.

The active material, the binder and the conductive material may be mixed with the organic solvent in powder form to prepare the positive electrode slurry and the negative electrode slurry. For example, the slurry may be prepared by mixing the active material powder, the binder powder containing polyvinylidene fluoride (PVdF), and the carbon-based powder used as the conductive material, with the organic solvent such as N-methyl-2-pyrrolidone (NMP). Then, the positive electrode and the negative electrode filled with the slurry are respectively heat-treated to fabricate the metal foam positive electrode 10 and the metal foam negative electrode 30 or 30a for a lithium secondary battery.

Finally, the separator and the negative electrode are sequentially laminated on both sides or one side of the metal foam positive electrode to form an electrode assembly, and the lithium secondary battery is assembled by putting and sealing the electrode assembly into the inside of a can or a pouch together with the electrolyte. As described above, the metal foam positive electrode and the metal foam negative electrode are separated using a separator interposed between the metal foam positive electrode and the negative electrode to prevent a short circuit between the positive electrode and the negative electrode.

As described above, in some embodiments, when a negative electrode is manufactured using a metal foam at least partially retaining a hollow state, a problem that a lithium agglomerate is formed on the surface of the negative electrode and falls into the electrolyte, and side effects that occurs due to lithium grown in a lithium dendrite structure can be solved at the same time.

Meanwhile, in the case of constructing a large-capacity battery for an electric vehicle, a stack-folding type structure having a structure in which strip-shaped positive electrodes and strip-shaped negative electrodes are successively folded using separators can be realized.

In the above-described embodiment, the electrode assembly in which the secondary battery forms a full cell has been described as an example. However, the present invention can also be applied to an electrode assembly having a bicell structure.

In addition, although the lithium ion battery using the electrolyte has been described in the above embodiments, the present invention can also be applied to a lithium polymer battery using a gel-type polymer electrolyte.

Hereinafter, the test results of the lithium secondary batteries according to the embodiments will be described in detail by conducting characteristic tests of the batteries based on the examples and the comparative examples of the embodiments. The embodiments are illustrative, and the scope of the present invention is not limited by these embodiments.

Example 1

About 0.06 g of $LiFePO_4$ as a cathode active material, about 0.012 g of carbon black as a conductive material and about 0.008 g of polyvinylidene fluoride (PVdF) as a binder were mixed with about 1 ml of N-methyl-2-pyrrolidone (NMP) as an organic solvent to prepare a slurry. The slurry was filled in pores of a metal foam made of a NiCrAl alloy having a pore size of about 450 μm and a thickness of about 1500 μm, and then heat-treated at about 140° C. to prepare a metal foam positive electrode for a lithium secondary battery.

Thereafter, a foil-type lithium thin film was attached to a rear surface of a porous copper foam having pores to prepare a negative electrode. Then, the two electrodes of the positive electrode and the negative electrode were separated by a separator and an electrolyte of about 1 M of $LiPF_6$ (in EC/DEC of 1:1) is injected into a can or pouch containing an electrode assembly formed by successively stacking the positive electrodes and the negative electrodes together with the separators, to prepare a battery of Example 1.

Embodiment 2

The same materials as in Example 1 were used as a positive electrode active material, a conductive material, and a binder, but a mixing ratio thereof was approximately 80:18:2 in a percentage by weight (wt %) ratio, and then mixed with an organic solvent to prepare a slurry. Thereafter, the slurry was coated on an aluminum foil as a positive electrode current collector, and then heat-treated at about 140° C. for about 12 hours to obtain a positive electrode for a lithium secondary battery.

Thereafter, a foil-type lithium thin film was attached to a rear surface of a porous copper foam having pores to prepare a negative electrode. Then, the two electrodes of the positive electrode and the negative electrode were separated by a separator and an electrolyte of about 1 M of $LiPF_6$ (in EC/DEC of approximately 1:1) is injected into a can or pouch containing an electrode assembly formed by successively stacking the positive electrodes and the negative electrodes together with the separators, to prepare a battery of Example 2.

Example 3

A metal foam positive electrode was fabricated in the same manner as in Example 2, except that the positive electrode slurry was filled in pores of a metal foam made of a NiCrAl alloy having a pore size of about 450 μm and a thickness of about 240 μm.

Thereafter, a foil-type lithium thin film was attached to a rear surface of a porous copper foam having pores to prepare a negative electrode. Then, the two electrodes of the positive electrode and the negative electrode were separated by a separator and an electrolyte of about 1 M of $LiPF_6$ (in EC/DEC of approximately 1:1) is injected into a can or pouch containing an electrode assembly formed by successively stacking the positive electrodes and the negative electrodes together with the separators, to prepare a battery of Example 3.

Comparative Example

A metal foam positive electrode was prepared in the same manner as in Example 1 above.

Thereafter, a lithium thin film in the form of a foil was used as a negative electrode, and the remainder was prepared in the same manner as in Example 1 to prepare a battery of the Comparative Example.

Experimental Example 1

The batteries fabricated by the methods of Example 1 and Comparative Example were charged and discharged for about 5 times at a current of about 3 mA between about 2.5 V and about 4 V, respectively, and a state in which a lithium agglomerate was formed on a surface of each of the negative electrodes was photographed. The negative electrode surface photograph of the battery of Example 1 and that of the Comparative Example were illustrated in FIGS. 3A and 3B, respectively.

Figure 3A:
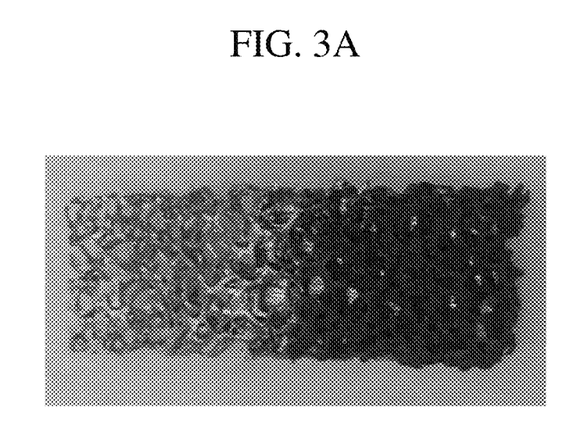
FIG. 3A is a photograph showing that a lithium agglomerate is electrodeposited on a surface of a lithium thin film in a comparative example using a lithium thin film as a negative electrode.
Figure 3B:
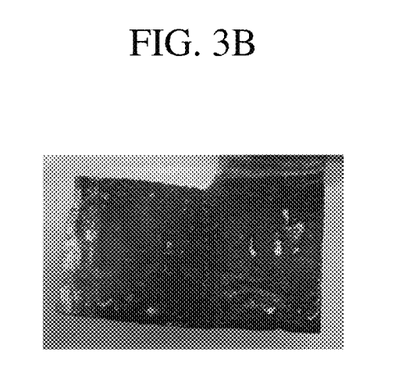
FIG. 3B is a photograph of a lithium agglomerate formed on a negative electrode in the first embodiment using a lithium negative electrode having a metal foam whose inner portions of pores are empty as the negative electrode.

Referring to FIG. 3B, when only a foil-type lithium thin film is used as a negative electrode as in the Comparative Example, a lot of lithium agglomerates are formed on the surface of the lithium negative electrode. However, referring to FIG. 3A, it can be seen that Example 1 in which a lithium thin film is attached to the rear surface of a copper metal foam may cause formation of lithium agglomerates in the metal foams to thus prevent the lithium agglomerates from flowing into the electrolyte.

Experimental Example 2

Figure 4:
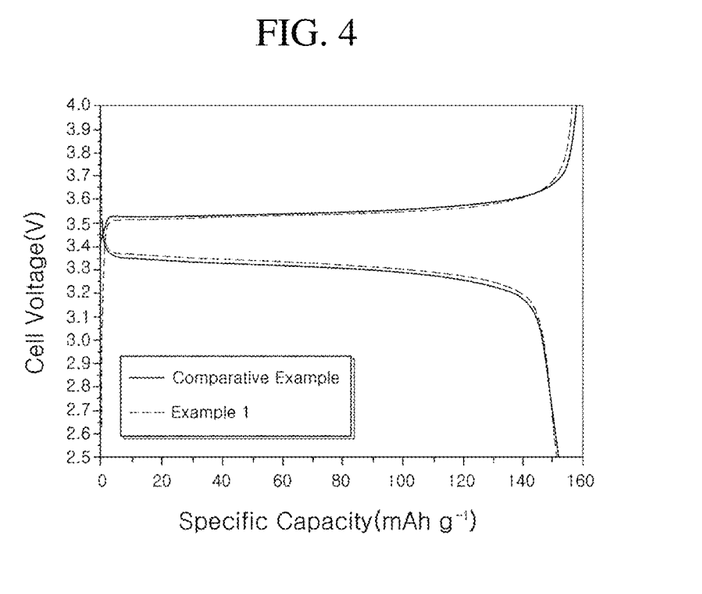
FIG. 4 is a graph showing a comparison of charge/discharge curves of the first embodiment battery in which a lithium thin film is attached on a rear surface of a copper foam and used as a negative electrode with a comparative example battery using a lithium thin film as a negative electrode.

The batteries manufactured by the methods of Example 1 and Comparative Example were measured at currents of about 3 mA and voltages between about 2.5 V to about 4 V, respectively, to obtain charge and discharge curves, and the comparison results are shown in the charge and discharge curves of FIG. 4.

Referring to FIG. 4, the battery of Comparative Example using only the lithium thin film as the negative electrode and the battery of Example 1 using the negative electrode having the lithium thin film attached on the rear surface of the copper foam show substantially the same capacities and the same charge/discharge curves each other. From this fact, it can be understood that even if the negative electrode is manufactured by attaching a lithium thin film on the rear surface of a copper foam as in Example 1, the capacity of the battery is not negatively affected.

Also, when the negative electrode is prepared in a structure that a lithium thin film is attached to the rear surface of the copper foam as in Example 1, lithium agglomerates are trapped in the copper foam and prevented from flowing into the electrolyte, as shown in FIG. 3A, and thus the safety and reliability of the battery can be improved.

Experimental Example 3

Figure 5:
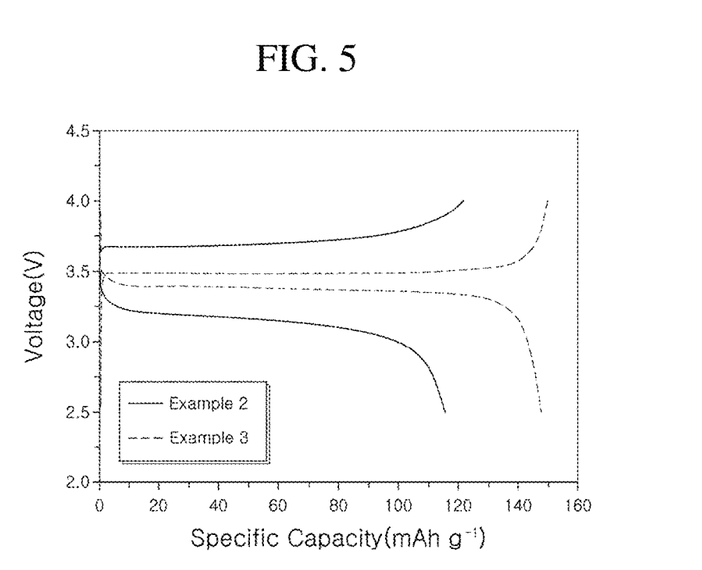
FIG. 5 is a graph showing a comparison of charge/discharge curves of the second embodiment battery in which a lithium thin film is attached to a rear surface of a copper foam in the same manner as the first embodiment and used as a negative electrode, and a metal foam is used as a positive electrode current collector which is a positive electrode, with a third embodiment battery using a metal foil.

The batteries manufactured by the methods of Example 2 and Example 3 were measured at currents of about 2 mA and voltages between about 2.5 V to about 4 V, respectively, to obtain charge and discharge curves, and the comparison results are shown in the charge and discharge curves of FIG. 5.

Referring to FIG. 5, the battery of Example 3 using the metal foam as the positive electrode current collector had better electrochemical characteristics than the battery of Example 2 using the metal foil as the positive electrode current collector, and thus it can be seen that the former exhibited higher capacity and lower resistance than the latter.

Experimental Example 4

Figure 6:
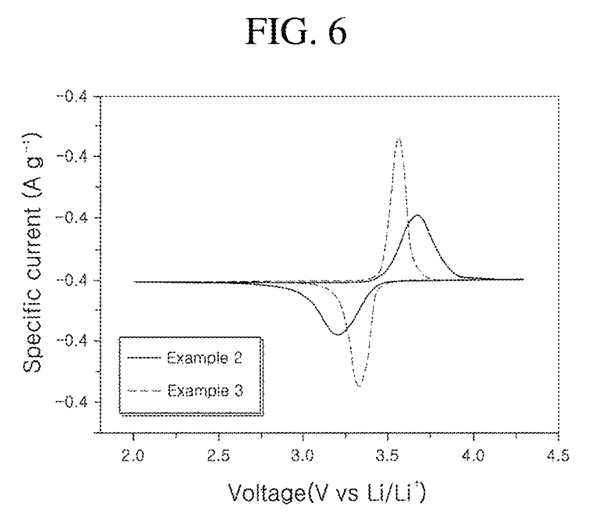
FIG. 6 is a graph showing a comparison of reaction rates of the second embodiment battery and the third embodiment battery.

The batteries manufactured by the methods of Example 2 and Example 3 were measured at a speed of about 0.1 mV s$^{-1}$ between about 2 V to about 4.3 V, respectively, to obtain response and speed curves, and the comparison results are shown in the response and speed curves of FIG. 6.

Referring to FIG. 6, since the battery of Example 3 using the metal foam as the positive electrode current collector was faster in an oxidation/reduction reaction speed than the battery of Example 2 using the metal foil as the positive electrode current collector, it can be seen that an oxidation/reduction peak occurs at a higher current, and a peak occurs near about 3.43 V, which is an Open Circuit Voltage (OCV) of $LiFePO_4$, which is a positive electrode active material.

Experimental Example 5

Figure 7:
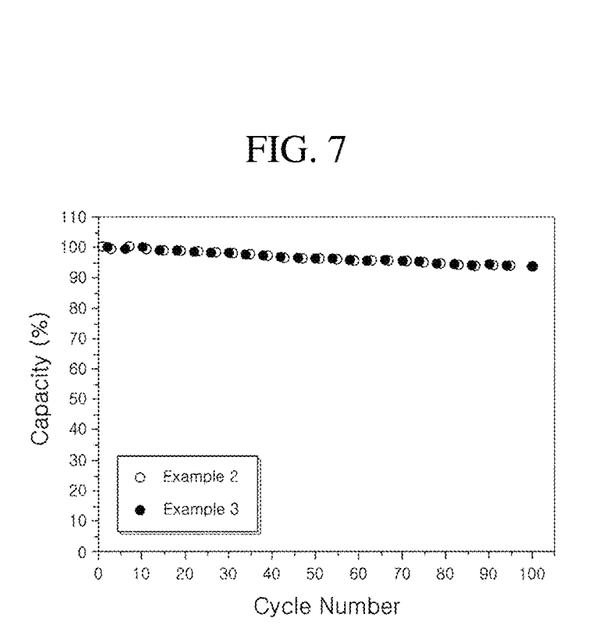
FIG. 7 is a graph showing the lifetime of the second embodiment battery and the third embodiment battery.

The batteries manufactured by the methods of Example 2 and Example 3 were compared through 100 times of charging and discharging at currents of about 0.5 mA between about 2.5 V to about 4 V, respectively, to obtain capacity reduction rates, and the comparison results are shown in the capacity reduction rates of FIG. 7.

Referring to FIG. 7, since the battery of Example 3 using a metal foam as a positive electrode current collector and the battery of Example 2 using a metal foil as a positive electrode current collector maintained a capacity of about 94% even after about 100-times charging/discharging curves, it can be seen that that the life of the battery is excellent even when a metal foam is used.

As described above, according to an embodiment, a lithium negative electrode having a metal foam is provided in which a lithium agglomerate generated on the surface of the lithium negative electrode is contained in the metal foam having pores whose inner portions are empty even during repeated charging and discharging, thereby preventing the lithium agglomerate from flowing into an electrolyte to thus suppress a volume expansion of a lithium secondary battery, which prevents the risk of explosion and secures stability.

Further, according to an embodiment, consumption of a lithium material due to charging/discharging is suppressed to prevent performance deterioration, so that safety and reliability of a lithium secondary battery can be greatly improved.

Further, according to an embodiment, metal foams are applied to the negative electrode to inhibit the formation of lithium agglomerates on the surface of the negative electrode and to prevent separation of the lithium agglomerates from the surface of the negative electrode to an electrolyte, and to solve side effects that occur when lithium is grown in a dendrite structure on the surface of the negative electrode when being overcharged.

According to an embodiment, a lithium thin film is attached or vapor-deposited on a rear surface of a metal foam of a negative electrode, or a slurry of a carbon-based or silicon-based negative electrode material is filled in a rear surface of a metal foam of a negative electrode, in which a front surface (a surface contacting an electrolyte) of the metal foam enlarges a surface area by keeping pores of the metal foam in an empty state, thereby increasing the adhesion of lithium atoms to the surface of the negative electrode, and even if a lithium agglomerate is formed, the lithium agglomerate can be trapped in the pores of the metal foam thereby preventing the lithium agglomerate from flowing into the electrolyte.

As a result, a volume expansion due to a repeated use of a lithium secondary battery can be suppressed, depletion of the lithium element can be prevented, and safety and reliability of the battery can be ensured.

The present invention can be applied to a lithium secondary battery which suppresses volume expansion and performance deterioration due to charging/discharging to greatly improve stability and reliability over conventional lithium secondary batteries, by using a metal foam having pores in a negative electrode together with a positive electrode as a current collector and adhering a lithium thin film to a rear surface of the negative electrode current collector in the negative electrode.

What is claimed is:
1. A negative electrode for a lithium secondary battery, the negative electrode comprising:
   a negative electrode current collector made of a metal foam having a plurality of pores; and
   a lithium thin film attached to a rear surface of the negative electrode current collector, wherein the metal foam includes: a first metal foam region having a plurality of first pores and in contact with the lithium thin film; and a second metal foam region having a plurality of second pores and being able to be in contact with a separator, the second metal foam region having a size larger than that of the first metal foam region, and wherein the first pores are filled with a negative electrode material, and the second pores remains empty and provide a space into which a lithium agglomerate is capable of being accommodated when a lithium secondary battery is charged or discharged.

2. The negative electrode for a lithium secondary battery of claim 1, wherein the first metal foam region has a thickness of less than 500 μm, in case where the lithium thin film has a thickness of 500 μm and the metal foam has a thickness of 1,000 μm.

3. The negative electrode for a lithium secondary battery of claim 1, wherein the metal foam is formed of Ni, Cu, a Ni frame coated with Cu, or a Ni—Cu alloy.

4. A lithium secondary battery comprising:
a positive electrode; a negative electrode according to claim 1; and a separator disposed between the positive electrode and the negative electrode.

\* \* \* \* \*